United States Patent
Cornwall et al.

(10) Patent No.: US 8,890,711 B2
(45) Date of Patent: Nov. 18, 2014

(54) SAFETY UTILITY RECONNECT

(75) Inventors: Mark K. Cornwall, Spokane, WA (US); Barry Cahill-O'Brien, Spokane, WA (US); Robert J. Strasser, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 339 days.

(21) Appl. No.: 12/892,235

(22) Filed: Sep. 28, 2010

(65) Prior Publication Data

US 2011/0074603 A1  Mar. 31, 2011

Related U.S. Application Data

(60) Provisional application No. 61/247,072, filed on Sep. 30, 2009.

(51) Int. Cl.
*G08B 23/00* (2006.01)
*G01D 4/00* (2006.01)

(52) U.S. Cl.
CPC .............. *G01D 4/004* (2013.01); *Y02B 90/242* (2013.01); *Y02B 90/246* (2013.01); *Y04S 20/322* (2013.01); *Y04S 20/42* (2013.01)
USPC .......................... 340/870.02; 705/412; 137/38

(58) Field of Classification Search
CPC ..................................................... G01D 4/004
USPC .................... 340/870.02–870.11; 705/412; 137/38–39
See application file for complete search history.

(56) References Cited

U.S. PATENT DOCUMENTS

| | | |
|---|---|---|
| 1,139,956 A | 5/1915 | Craft |
| 1,958,159 A | 5/1934 | Bresson |
| 2,021,041 A | 11/1935 | Altamura |
| 2,558,188 A | 6/1951 | McWilliams |
| 2,699,177 A | 1/1955 | Wingfield |
| 2,903,540 A | 9/1959 | Gloviak et al. |
| 2,931,876 A | 4/1960 | Weinfurt |
| 3,346,710 A | 10/1967 | Weston et al. |
| 3,378,663 A | 4/1968 | Abramowitz |
| 3,381,105 A | 4/1968 | Mortenson |

(Continued)

FOREIGN PATENT DOCUMENTS

| | | |
|---|---|---|
| CH | 281257 | 2/1952 |
| DE | 619902 | 10/1935 |

(Continued)

OTHER PUBLICATIONS

Machine translation of DE 619902 listed above.
Machine translation of CH 281257 listed above.
BLP, "X-Pulse: Introducing The New Residential Total Disconnect/Reconnect System", Power & Utilities brochure.

(Continued)

*Primary Examiner* — Albert Wong
(74) *Attorney, Agent, or Firm* — Dority & Manning, P.A.

(57) ABSTRACT

Disclosed are apparatus and methodology for providing safe reconnection of remotely disconnectible gas meters. In accordance with the present subject matter, a gas metering device is provided with a remotely controllable valve and has associated therewith indicia uniquely identifying the meter. A gas company representative or other authorized person must be physically present to read the meter associated data, enter corresponding data into a handheld device, and transmit a signal from such handheld device to the meter to initiate reclosure. In such manner, physical presence of a gas company representative is required at the time of reconnection to provide other services and functionality such as equipment inspection and/or pilot relighting as required for safety considerations.

18 Claims, 2 Drawing Sheets

(56) References Cited

U.S. PATENT DOCUMENTS

| | | | |
|---|---|---|---|
| 3,632,935 A | 1/1972 | Stegmaier | |
| 3,689,856 A | 9/1972 | Lambert et al. | |
| 3,751,618 A | 8/1973 | Hallerberg | |
| 3,842,228 A | 10/1974 | Green | |
| 3,902,032 A | 8/1975 | Koepke | |
| 4,006,323 A | 2/1977 | Nelson et al. | |
| 4,087,669 A | 5/1978 | Sauer | |
| 4,178,572 A | 12/1979 | Gaskill et al. | |
| 4,230,388 A | 10/1980 | Thierry et al. | |
| 4,240,030 A | 12/1980 | Bateman et al. | |
| 4,309,581 A | 1/1982 | Macaire et al. | |
| 4,321,436 A | 3/1982 | McGarrity | |
| 4,357,509 A | 11/1982 | Adlerteg | |
| 4,412,116 A | 10/1983 | Golub | |
| 4,490,593 A | 12/1984 | Cook | |
| 4,550,232 A | 10/1985 | Lemmer | |
| 4,562,323 A | 12/1985 | Belbel et al. | |
| 4,597,619 A | 7/1986 | Reimer | |
| 4,621,303 A | 11/1986 | Rowe | |
| 4,801,772 A | 1/1989 | Bratkowski et al. | |
| 4,866,633 A | 9/1989 | Nakane et al. | |
| 5,021,760 A | 6/1991 | Krubsack et al. | |
| 5,045,969 A | 9/1991 | Menasco | |
| 5,209,454 A * | 5/1993 | Engdahl et al. | 251/65 |
| 5,227,750 A | 7/1993 | Connell et al. | |
| 5,251,653 A | 10/1993 | Tucker et al. | |
| 5,287,884 A | 2/1994 | Cohen | |
| 5,296,660 A | 3/1994 | Morel et al. | |
| 5,296,662 A | 3/1994 | Engdahl et al. | |
| 5,546,269 A | 8/1996 | Robinson et al. | |
| 5,572,396 A | 11/1996 | Robinson | |
| 5,575,309 A | 11/1996 | Connell | |
| 5,583,471 A | 12/1996 | Weiser et al. | |
| 5,586,913 A | 12/1996 | Robinson et al. | |
| 5,608,598 A | 3/1997 | Dieppedalle et al. | |
| 5,668,538 A * | 9/1997 | Warwick | 340/870.02 |
| 5,694,099 A | 12/1997 | Connell et al. | |
| 5,748,104 A | 5/1998 | Argyroudis et al. | |
| 5,821,481 A | 10/1998 | Neubauer | |
| 5,853,305 A | 12/1998 | Bedrossian et al. | |
| 5,886,860 A | 3/1999 | Chen et al. | |
| 5,920,265 A | 7/1999 | Johnson et al. | |
| 5,952,739 A | 9/1999 | Grass et al. | |
| 6,000,931 A | 12/1999 | Tanabe et al. | |
| 6,034,585 A | 3/2000 | Donhauser | |
| 6,046,660 A | 4/2000 | Gruner | |
| 6,046,661 A | 4/2000 | Reger et al. | |
| 6,056,008 A | 5/2000 | Adams et al. | |
| 6,080,949 A | 6/2000 | Weber et al. | |
| 6,104,586 A | 8/2000 | Robinson | |
| 6,246,306 B1 | 6/2001 | Gruner | |
| 6,252,478 B1 | 6/2001 | Gruner | |
| 6,292,075 B1 | 9/2001 | Connell et al. | |
| 6,320,485 B1 | 11/2001 | Gruner | |
| 6,323,774 B1 | 11/2001 | Mitchell | |
| 6,437,692 B1 | 8/2002 | Petite et al. | |
| 6,441,332 B1 | 8/2002 | Crawford et al. | |
| 6,470,903 B2 | 10/2002 | Reyman | |
| 6,513,545 B2 | 2/2003 | Rhone et al. | |
| 6,520,798 B1 | 2/2003 | Robinson et al. | |
| 6,563,409 B2 | 5/2003 | Gruner | |
| 6,600,931 B2 * | 7/2003 | Sutton et al. | 455/552.1 |
| 6,661,319 B2 | 12/2003 | Schmelz | |
| 6,788,176 B2 | 9/2004 | Schmelz | |
| 6,892,751 B2 | 5/2005 | Sanders | |
| 6,906,637 B2 | 6/2005 | Martin | |
| 6,925,891 B2 | 8/2005 | Suginouchi et al. | |
| 6,994,309 B2 | 2/2006 | Fernandez-Sein | |
| 7,049,932 B2 | 5/2006 | French et al. | |
| 7,064,671 B2 | 6/2006 | Vanderah et al. | |
| 7,069,161 B2 | 6/2006 | Gristina et al. | |
| 7,088,239 B2 | 8/2006 | Basinger et al. | |
| 7,091,878 B2 * | 8/2006 | Holle et al. | 340/870.02 |
| 7,116,243 B2 | 10/2006 | Schleich et al. | |
| 7,130,722 B2 | 10/2006 | Soni | |
| 7,228,726 B2 | 6/2007 | Kates | |
| 7,262,709 B2 | 8/2007 | Borleske et al. | |
| 7,265,652 B2 | 9/2007 | Ying | |
| 7,271,987 B1 | 9/2007 | Zhang et al. | |
| 7,298,288 B2 | 11/2007 | Nagy et al. | |
| 7,362,232 B2 | 4/2008 | Holle et al. | |
| 7,412,876 B2 | 8/2008 | Kates | |
| 7,458,387 B2 * | 12/2008 | McGill | 137/39 |
| 7,458,846 B2 | 12/2008 | Loehr et al. | |
| 7,833,034 B2 | 11/2010 | Connell | |
| 7,880,641 B2 | 2/2011 | Parris et al. | |
| 8,040,664 B2 | 10/2011 | Makinson et al. | |
| 8,054,199 B2 | 11/2011 | Addy | |
| 8,176,936 B2 | 5/2012 | Naganuma et al. | |
| 8,269,651 B2 * | 9/2012 | Zigdon et al. | 340/870.11 |
| 8,395,484 B2 | 3/2013 | Pontin et al. | |
| 2001/0010032 A1 | 7/2001 | Ehlers et al. | |
| 2002/0030604 A1 | 3/2002 | Chance et al. | |
| 2002/0050885 A1 | 5/2002 | Gruner | |
| 2005/0162149 A1 | 7/2005 | Makinson et al. | |
| 2005/0174256 A1 | 8/2005 | Berg | |
| 2005/0195078 A1 | 9/2005 | Basinger et al. | |
| 2006/0031180 A1 | 2/2006 | Tamarkin et al. | |
| 2006/0066425 A1 | 3/2006 | Gruner | |
| 2006/0278269 A1 | 12/2006 | McGill | |
| 2007/0021936 A1 | 1/2007 | Marovitz | |
| 2007/0211768 A1 | 9/2007 | Cornwall et al. | |
| 2008/0177678 A1 | 7/2008 | Di Martini et al. | |
| 2008/0219210 A1 | 9/2008 | Shuey et al. | |
| 2008/0290986 A1 | 11/2008 | Laughlin-Parker et al. | |
| 2011/0000310 A1 | 1/2011 | Yokohata et al. | |
| 2011/0074601 A1 | 3/2011 | Cornwall | |

FOREIGN PATENT DOCUMENTS

| | | |
|---|---|---|
| DE | 1753688 | 10/1957 |
| EP | 0532586 | 4/1996 |
| EP | 0714549 | 5/1998 |
| EP | 0643813 | 6/1998 |
| GB | 1384294 | 2/1975 |
| WO | WO 91/19314 | 12/1991 |
| WO | WO 94/23230 | 10/1994 |
| WO | WO 95/05671 | 2/1995 |
| WO | WO/98/40898 | 9/1998 |
| WO | WO 03/046936 | 6/2003 |
| WO | WO 03/049129 | 6/2003 |
| WO | WO 2005/106907 | 11/2005 |
| WO | WO 2006/024855 | 3/2006 |
| WO | WO 2006/035235 | 4/2006 |
| WO | WO 2009/110192 | 9/2009 |

OTHER PUBLICATIONS

Thomas E. Browne, Jr., Editor; "Circuit Interruption Theory and Techniques", Westinghouse Research and Development Center, Pittsburgh, Pennsylvania, Copyright 1984 by Marcel Dekker, Inc.
Slade, *Electric Contact Phenomena*, pp. 586-593.
PCT International Search Report for PCT International Application No. PCT/US2009/045555 mailed Jul. 20, 2009.
David J. Southern P.E., Product Development Manager, FreeWave Technologies, Inc., "Operators Extend SCADA Investment to Vital Cathodic Protection", pp. 16-17 of *Remote Site & Equipment Management Magazine*, Jun./Jul. 2008.
International Search Report for PCT International Application No. PCT/US2009/045554 mailed Jul. 29, 2009.
PCT International Search Report for PCT International Application No. PCT/US2010/050383 dated Nov. 18, 2010.
PCT Written Opinion of the International Searching Authority for PCT International Application No. PCT/US2010/050383 dated Nov. 18, 2010.
Feb. 28, 2013 Office Action issued in U.S. Appl. No. 12/892,985.
Mar. 13, 2013 Office Action issued in U.S. Appl. No. 12/891,857.
Mexican Official Action No. 67910 dated Jul. 19, 2013 for Mexican Patent Application No, MX/a/2012/003781 (indicating acceptance to issue related Mexican application; no translation available).
Office Action issued Sep. 29, 2014 for U.S. Appl. No. 12/891,857.
Aug. 20, 2013 Office Action issued for U.S. Appl. No. 12/891,857.

* cited by examiner

SAFETY UTILITY RECONNECT

PRIORITY CLAIM

This application claims the benefit of previously filed U.S. Provisional patent application entitled "POSITIVE IDENTIFICATION ON GAS RECONNECT," assigned U.S. Ser. No. 61/247,072, filed Sep. 30, 2009, and which is incorporated herein by reference for all purposes.

FIELD OF THE INVENTION

The present subject matter relates to gas supply devices. More particularly, the present subject matter relates to reconnecting remotely operable gas shut-off apparatus and associated methodologies.

BACKGROUND OF THE INVENTION

Utility companies perform a critically important task of providing needed commodities such as electrical power, gas, water, and others to businesses and households. Such commodities not only make possible desired comfort but provide a truly fundamental cornerstone of modern living. In turn, processes have evolved in response to demand/need for ever increasing efficient reading and interaction with meters installed at such locations, to facilitate requisite and appropriate billing for the services of providing such commodities. Such efforts have more recently evolved from expensive, time-consuming personnel-intensive efforts, requiring on-site inspection and/or handling of meter issues and related concerns, to relatively more remotely controlled events and servicing.

The need for such "remote" activities, whether meter reading or adjunct meter and/or commodities management, have grown both in scope and type. In other words, not only is it desired to remotely detect meter readings and conduct activities adjunct thereto, but also to detect and manage equipment malfunctions, whether occurring naturally (such as storm related), or occurring intentionally (such as in meter tampering or commodities theft). It is also highly desirable to provide systems and controls which can prevent problems before they happen and/or provide relatively early detection and effective management.

In many instances, the prospect of equipment malfunction (whether through tampering, accidents, or longevity/maintenance failures) can raise serious safety issues inherent to the commodities being delivered/managed on-site. For example, emergencies may arise due to gas leakages, or fires, whether originated from gas, electrical, or other sources. In fact, a number of potential safety problems are well known in the industry. Accordingly, management and control of metering systems and related delivering a variety of commodities remains an important area of interest from a safety perspective, particularly as industry and societal needs drive requirements for ever-increasing remotely-based activities/management.

Various patents and patent applications provide disclosures directed to gas or fluid metering or distribution systems that may include aspects relating to shut off valve control or management. For example, U.S. Pat. No. 7,088,239 to Basinger et al. discloses an apparatus for routine monitoring and automatic reporting of electrical power and gas utility usage that also provides means for detecting and reporting to the relevant utility companies the development of local hazards on premises at which one or more utility usage meters are installed. The system includes a remote computer capable of turning on or off the supply of gas at the meter, perhaps as a result of the utility user not having made timely payments for the usage of gas. The meter has the capability to send a return or confirmation signal to the remote computer to confirm that the supply of gas has been shut off.

U.S. Pat. No. 6,892,751 to Sanders discloses a building protection system, involving the transmission of signals to LED's to indicate whether the shutoff valve is in the open or closed position. U.S. Pat. No. 6,470,903 to Reyman discloses an automatically actuated regulation system for a natural gas pipeline, which involves reporting the position of a shutoff valve, whether open or closed, to the utility company through a signal. The utility company may communicate remotely through a modem to actuate such shutoff valve.

U.S. Pat. No. 6,000,931 to Tanabe et al. discloses a gas safety control system for supplying a gas that is forwarded from a gas supply source through an inspection meter to one or more gas appliances, involving the output of cutoff information indicating that the supply of gas is cut off by a cut off valve.

U.S. Patent Application Publication No. 2006/0278269 to McGill discloses a safety valve that is positioned in supply plumbing that supplies a fluid medium such as natural gas to a point of use structure such as a home. A mechanical actuator is provided remote from the safety valve but mechanically connected to the safety valve. The mechanical actuator can be actuated by seismic disturbance, manually, or by activation by remote sensor or home security system. The actuator provides a status viewer for viewing the status of the valve (either ON or OFF). The system does not transmit the status indicator to a remote location.

U.S. Pat. No. 7,458,387 to McGill is directed to an emergency gas and electricity cutoff apparatus and control system, including a gas meter having a gas flow shut off valve. The system includes a controller remote from the gas flow shut off valve that is capable of sending a gas flow shut off signal to the shutoff valve. A valve shut-off signal may be sent from a controller to the valve for activation, through use of a wire or by RF.

U.S. Pat. No. 6,056,008 to Adams et al. discloses an intelligent pressure regulator for maintaining a fluid in a process at a predetermined pressure that includes an electronic controller which enhances regulator performance and provides self-diagnostics and communications capabilities. The regulator can be adapted to receive through the communications circuit an electrical signal representing a desired pressure of the process fluid and to store a digital representation of that electrical signal in the memory. U.S. Pat. No. 7,064,671 to Vanderah et al. discloses a pressure regulator with wireless communications capabilities. The regulator includes various methods of conserving the amount of power consumed by the pressure regulator system.

The disclosures of all such patent related publications referenced herein are fully incorporated herein by reference for all purposes.

While various implementations of gas supply control apparatus and methodologies have been developed, and while various combinations of remote operating systems and devices have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved apparatus and methodologies for providing gas reconnection in systems where gas flow can be remotely shut off by way of a meter reading system are provided.

In an exemplary configuration, an exemplary present remotely operable valve is associated with a gas metering device and configured to be closed only during the physical presence of a gas company representative or other authorized person.

In one of its simpler forms, a present exemplary remotely operable valve has been incorporated into a gas metering device and configured to be placed in a closed position upon entry of data physically associated with the subject gas meter.

Another positive aspect of certain embodiments of the present type of device is that gas utilities may easily be remotely disconnected without having to send equipment and personnel to the gas consumption location but block reclosure (i.e., reconnection) until selected individuals are physically present at the meter location.

In accordance with aspects of certain embodiments of the present subject matter, methodologies are provided to provide gas reconnection by signal transmission from a handheld device.

In accordance with further aspects of other embodiments of the present subject matter, methodologies are provided to remotely disconnect selected gas utilities by way of disconnection commands sent over a fixed network meter reading system but to disallow reconnect instructions over the same fixed network or otherwise, except as specifically desired.

It should be appreciated by those of ordinary skill in the art from the complete disclosure herewith that the present subject matter is intended to equally encompass both devices and associated methodologies.

One present exemplary embodiment of the subject technology relates to an advanced meter reading system for transmitting between user locations and a centralized data collection facility data and commands related to utility usage and utility supply connections. Such present exemplary system preferably comprises a plurality of utility metrology means and associated endpoint devices, situated at respective locations of utility consumption, for bidirectional communications for transmitting utility consumption data associated with a respective location and for receiving commands thereto; at least one remotely controllable disconnect/reconnect means, associated with at least one of such utility metrology means and its associated endpoint device, for disconnecting a utility supply associated with such at least one utility metrology means at its respective location in response to a disconnect signal transmitted to such disconnect/reconnect means, and for selectively reconnecting such utility supply only in response to a coded reconnect signal transmitted thereto; a main communications network for bidirectional communications with such endpoint devices; and a head end processor for bidirectional communications with such main communications network. With such arrangement, advantageously utility consumption data and disconnect signal commands, respectively, are communicated to and from such head end processor via such main communications network.

In some present embodiments, such exemplary systems may further include a mobile device in RF communication with other components of such system, for controllably receiving utility consumption data and for selectively sending reconnect signal commands incorporating a coded reconnect signal embedded therein, uniquely associated with a targeted disconnect/reconnect means at a respective location. In further of such alternatives, such coded reconnect signal may include indicia uniquely associated with a respective location at which utility supply is to be reconnected. Still further in some variations such indicia may comprise one of human readable indicia physically associated with a metrology means to be reconnected and electronically readable indicia associated onsite with such metrology means, thereby requiring operator presence at such metrology means for entry of coded reconnect data into such mobile device. Such further, per some present alternatives, such metrology means may include memory for counterchecking coded reconnect data received thereat and blocking operation of such targeted disconnect/reconnect means at such respective location if such coded reconnect data does not match such memory.

Some further alternative present exemplary systems may additionally include at least one collector, for bidirectional communications with such endpoint devices and such main communications network; and a plurality of remotely controllable disconnect/reconnect means, respectively associated with selected of such endpoint devices, for respectively disconnecting a utility supply associated with such endpoint device locations in response to respective disconnect signals transmitted thereto, and for selectively reconnecting such utility supply only in response to a coded reconnect signal for its respective location transmitted thereto; and wherein such utility consumption may comprise one of gas and water consumption.

Other present alternative systems may further include a plurality of remotely controllable disconnect/reconnect means, respectively associated with selected of such endpoint devices, for respectively disconnecting a utility supply associated with such endpoint device locations in response to respective disconnect signals transmitted thereto, and for selectively reconnecting such utility supply only in response to a coded reconnect signal for its respective location transmitted thereto; wherein such utility consumption may comprise gas consumption; such utility metrology means may comprise respective gas meters; such utility supply may comprise a gas line associated with such utility consumption locations; and such disconnect/reconnect means respectively may comprise controllable valves inline with such supply gas line and associated with its respective endpoint device.

Yet in other present alternative systems, such utility consumption may comprise gas consumption; such system may further include a plurality of telemetry devices respectively associated with a plurality of utility consumption locations, each of such telemetry devices monitoring for a preselected condition at its respective location, and transmitting data to such head end processor related to such preselected condition; and such telemetry devices respectively may include alarm means for forwarding alarm signaling to such head end processor whenever monitored conditions thereat fall outside set parameters.

In other alternative systems, such head end processor may further include data management means, for storing and processing utility consumption data; and such main communications network may comprise one of a WAN, a wireless network, and the internet.

Certain present exemplary alternative advanced meter reading systems may further include at least one collector, for bidirectional communications with such endpoint devices and such main communications network; a plurality of remotely controllable disconnect/reconnect means, respectively associated with selected of such endpoint devices, for respectively disconnecting a utility supply associated with such endpoint device locations in response to respective disconnect signals transmitted thereto, and for selectively reconnecting such utility supply only in response to a coded reconnect signal for its respective location transmitted thereto; and a mobile device in RF communication with other components of such system, for controllably receiving utility consumption data and for selectively sending reconnect signal commands incorporating a coded reconnect signal embedded therein, uniquely associated with a targeted disconnect/reconnect means at a respective location. Further preferably in such alternative embodiments, such utility consumption may comprise gas consumption; such utility metrology means may comprise respective gas meters; such utility supply may comprise a gas line associated with such utility consumption locations; such disconnect/reconnect means respectively may comprise controllable valves inline with such supply gas line and associated with its respective endpoint device; such head end processor may further include data management functionality, for storing and processing utility consumption data; such main communications network may comprise one of a WAN, a wireless network, and the internet; and such coded reconnect signal may include indicia uniquely associated with a respective location at which utility supply is to be reconnected, and entered into such mobile device by a user situated at a respective location to be reconnected.

Another present exemplary embodiment in accordance with the present subject matter may relate to a bidirectional gas AMI network for transmitting commands and gas supply related data between user locations and a centralized data collection facility. Such present exemplary network may preferably comprise a plurality of combined host/endpoint devices associated with respective gas locations, such endpoint devices providing bidirectional RF communications from its respective location; a plurality of remotely controllable disconnect/reconnect means, respectively associated with selected of such endpoint devices, for respectively disconnecting a gas supply associated with such endpoint device locations in response to respective disconnect signals transmitted thereto, and for selectively reconnecting such gas supply only in response to a coded reconnect signal for its respective location transmitted thereto; a main communications network for bidirectional communications with such endpoint devices; a centralized data collection facility in bidirectional communications with such main communications network, such that gas supply related data and disconnect signal commands, respectively, are communicated to and from such centralized data collection facility via such main communications network; and a mobile device in RF communication with other components of such network, for controllably receiving gas supply related data and for selectively sending reconnect signal commands incorporating a coded reconnect signal embedded therein, having indicia uniquely associated with a targeted disconnect/reconnect means at a respective location at which gas supply is to be reconnected.

Certain alternative such exemplary networks may further include a plurality of data collection devices, for bidirectional communications with selected of such endpoint devices and such main communications network; and wherein such indicia may comprise one of human readable indicia physically associated with an endpoint device location to be reconnected and electronically readable indicia associated onsite with such location to be reconnected. Such an arrangement advantageously thereby requires operator presence at such location for entry of coded reconnect data into such mobile device.

In other present alternatives, such host devices may comprise one of a pressure regulator device, and a gas metrology device so that combined gas metrology/endpoint devices obtain and transmit gas usage data associated with their respective location. In certain of such alternatives, such disconnect/reconnect means respectively may comprise controllable valves inline with a supply gas line associated with its respective endpoint device; and such gas metrology device may include memory for counterchecking coded reconnect data received thereat and blocking operation of such targeted disconnect/reconnect means at such respective location if such coded reconnect data does not match such memory.

In yet other present alternative networks, such centralized data collection facility may include a head end processor having meter data management means for storing and processing data received via such network; and such main communications network may comprise one of a WAN, a wireless network, and the internet.

Further embodiments of the present subject matter may equally relate to corresponding and/or related methodology. One present example thereof relates to a method for gathering data for monitoring gas consumption associated with a gas pipeline of a gas utility provider, and for selectively disconnecting gas supplies at selected locations and safely reconnecting previously disconnected gas supplies. Such methodology may preferably comprise transmitting gas consumption data from a plurality of endpoint devices associated with respective locations of gas utility usage; communicating such data to a head end processor via a main communications network; selectively transmitting disconnect signal commands from such head end processor to disconnect valves at selected locations of gas utility usage, to disconnect such locations from an associated gas supply; and using a mobile device to selectively transmit reconnect signal commands incorporating a coded reconnect signal embedded therein, uniquely and physically associated with a targeted respective gas utility usage location to be reconnected, thereby for safety requiring physical presence of an authorized operator of such mobile device at the location to be reconnected.

Certain of such method embodiments may further include counterchecking a transmitted coded reconnect signal to confirm a match with a targeted location to be reconnected; and thereafter reconnecting such location to an associated gas supply. In some of such alternatives, such reconnecting may further include selected activation of controllable valves operatively associated inline with selected sections of a supply gas pipeline, respectively associated with a targeted location.

Per other present alternative methods, such coded reconnect signal may be based on indicia uniquely associated with a targeted respective gas utility usage location to be reconnected, which indicia comprises one of human readable indicia physically associated with a metrology means to be reconnected and electronically readable indicia associated onsite with such metrology means. Such a methodology advantageously requires operator presence at such metrology means for entry of coded reconnect data into such mobile device.

Still further alternative present exemplary methodologies further include using the mobile device to selectively transmit disconnect signal commands to disconnect valves at selected locations of gas utility usage, to disconnect such locations from an associated gas supply; conducting data management at the central location, for storing and processing gas consumption data received thereat via the network; and wherein the network at least in part may comprise one of a WAN, a wireless network, and the Internet.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figure, in which.

Repeat use of reference characters throughout the present specification and appended drawings is intended to represent same or analogous features or elements of the present subject matter.

DETAILED DESCRIPTION OF THE PREFERRED EMBODIMENTS

As discussed in the Summary of the Invention section, the present subject matter is particularly concerned with apparatus and methodologies for providing gas reconnection in systems where gas flow can be remotely shut off by way of a meter reading system.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Figure 1:
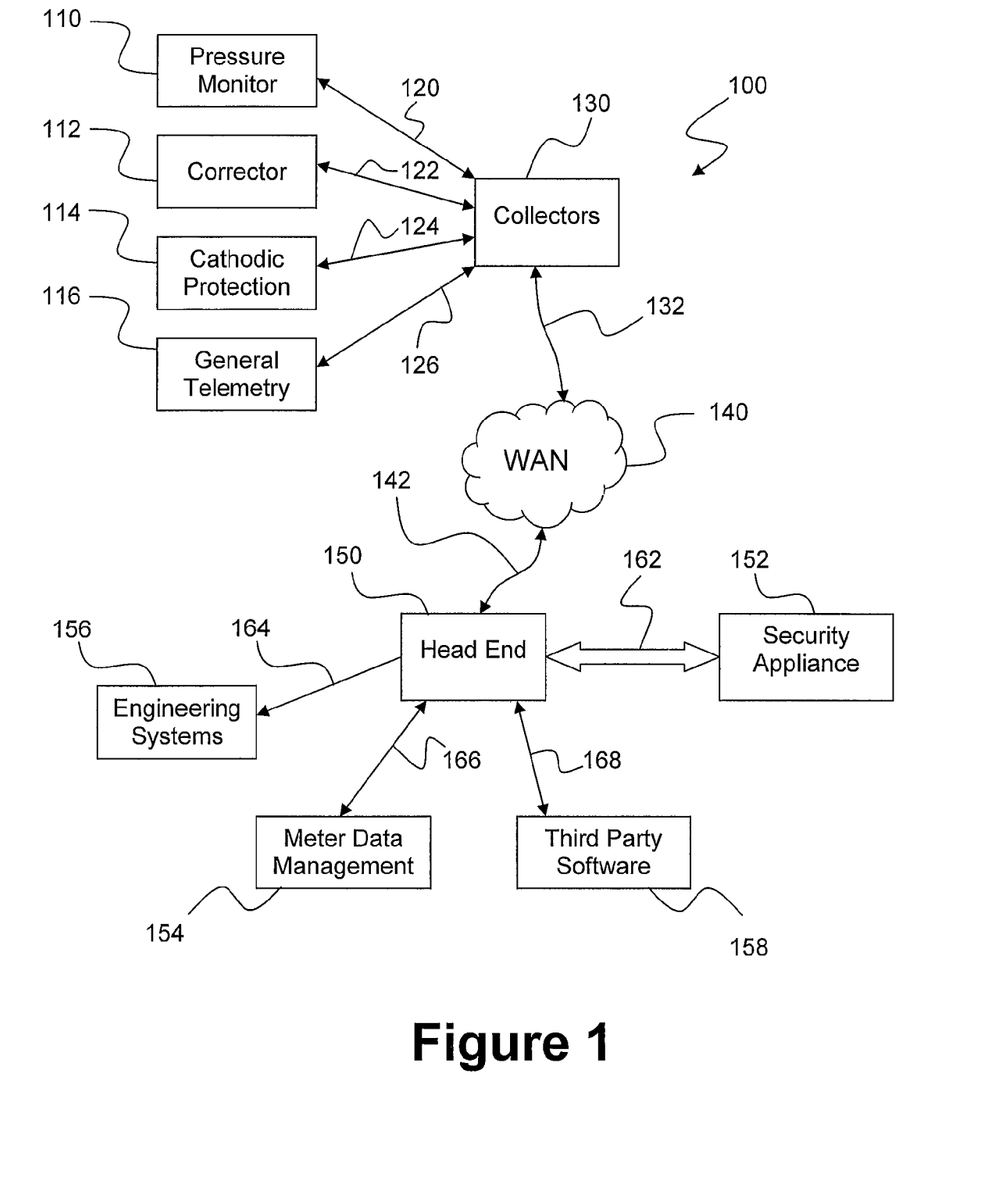
FIG. 1 is a block diagram of an exemplary Advanced Metering System (AMS) usable in accordance with the present subject matter for remote disconnection functionality and related reconnect functionality.

Reference is made in detail to the presently preferred embodiments of a subject telemetry system with which communications of the present subject matter may be practiced. Referring now to the drawings, FIG. 1 illustrates an exemplary telemetry system generally 100, which may include various exemplary telemetry endpoints 110, 112, 114, and 116 located within, for example, a Gas AMI network, and which are read by network collectors 130. Telemetry endpoints may include, but are not limited to, a pressure monitor 110, a data corrector 112, cathodic protection apparatus 114, and general telemetry apparatus 116. Such exemplary telemetry endpoints 110, 112, 114, and 116 may be connected for data transmission via transmission paths 120, 122, 124, and 126, respectively, to collectors 130.

It should be appreciated that while transmission paths 120, 122, 124, and 126 are presently illustrated as transmission lines, such is not a specific limitation of the present technology as data may be transmitted by any suitable technology, including via wired as well as wireless technology. In similar fashion, transmission paths 162, 164, 166, and 168 (illustrated as variously coupled data between head end associated items) may also correspond to any suitable data transmission capable device or methodology, now existing or later developed.

Those of ordinary skill in the art will appreciate that the illustration in FIG. 1 with respect to the network configuration is exemplary and that other components, for example, but not limited to, repeaters, may also be employed. It should be appreciated that while the present subject matter is described more specifically as directed to gas AMI networks, such is not a specific limitation of the disclosure as the present disclosure may be extended to water and electric networks, as applicable, particularly as to selected portions of the present disclosure. For example, with reference to water systems, it may be desirable to have personnel on-site in charge of enabling such reconnections, such as to ensure that there are no hazards on site, such as a continued leakage or interplay with electrical circuits.

Further, while the present communications system is described as a network, other and additional communication forms including the use of mobile data collection apparatus may be employed within the scope of the present disclosure. Still further, while the present disclosure describes the use of a WAN to transmit information (either data or instructions) among selected devices, such is illustrative only as other information exchange apparatus may be used to provide desired communications including, but not limited to, WAN's, LAN's, all varieties of wireless systems, and the Internet, and intended to include other later developed technologies.

In accordance with present exemplary disclosure, information from such exemplary endpoints 110, 112, 114, and 116 may be processed in the collectors 130 and sent over a WAN generally 140 to a head end system generally 150 by way of exemplary transmission paths 132, 142. The head end system 150 may further process the endpoint reading or data and send that information to other systems. Long-term storage can, of course, be provided by, for example, a meter data management (MDM) system generally 154, not presently illustrated in detail, and details of which form no particular aspect of the present subject matter. Such system 154 may also be considered as meter data management means associated with the head end or centralized data collection facility, for storing and processing data received via the telemetry system generally 100. For telemetry, there may be other systems that are not part of an AMR/AMI network, such as engineering systems generally 156 that monitor distribution system pressure, or software systems generally 158 provided by the manufacturer of the correctors 112 or other components monitored by the endpoints. Other systems, not presently illustrated, may also be included in system 100. Also, the representative endpoints 110, 112, 114, and 116 are intended to be understood by those of ordinary skill in the art as representing any number of such endpoints in use in a given system configuration in accordance with present subject matter, variously and respectively associated with collectors as needed.

Endpoints 110, 112, 114, and 116 "bubble-up" readings of the telemetry data periodically as needed for measurement resolution and network reliability. As described, for example, in U.S. Pat. No. 7,298,288 B2, assigned to the owner of the present technology, battery-powered endpoints have been designed to limit the power consumed in day-to-day operation. One known design feature is a bubble-up mode of operation, in which an endpoint "bubbles-up," or activates its transceiver to communicate or attempt to communicate with the AMR data collection system, according, for example, to a preset schedule. The time duration or period between bubble-up events may typically span seconds or minutes.

Endpoints 110, 112, 114, and 116 may also contain alarm thresholds. Per the present subject matter, when such thresholds are exceeded, the associated endpoint will initiate an alarm to relatively rapidly indicate an over/under threshold situation to the head end 150. Such alarms may take the form of special messages and may be sent at a higher frequency than normal transmissions to ensure rapid and reliable delivery. Parameters stored in collectors 130 may also be changed through the use of two-way commands from the system head end 150 down to the collectors. Thought of in different terms, it is to be understood that all such various alarm features may be considered as being alarm means for forwarding alarm signaling whenever monitored conditions thereat fall outside set parameters (whether initially set or subsequently reset).

Collectors 130 validate the readings from the endpoints 110, 112, 114, and 116 and prioritize the uploading of data to the head end 150. Collectors 130 can also evaluate data from the endpoints 110, 112, 114, and 116 and generate alarms as well, per the present subject matter.

At head end 150, data is further validated, alarms may also be generated, and alarms and data are exported to an external system. Head end 150 can also accept requests from an external system (not presently illustrated) to send reconfiguration messages through the network to the endpoints 110, 112, 114, and 116, all per the present subject matter.

Figure 2:
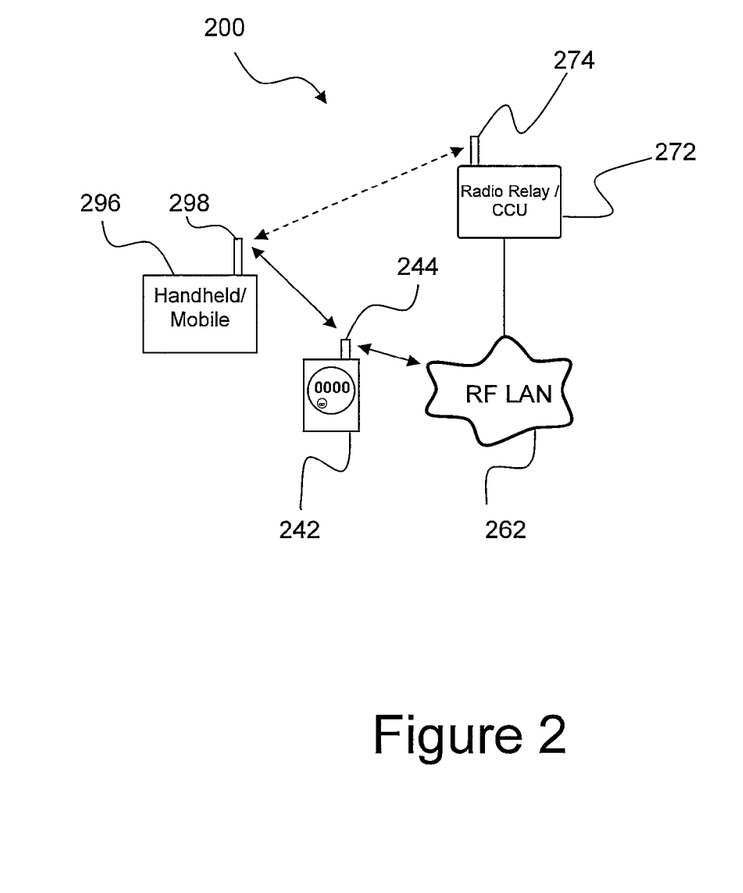
FIG. 2 illustrates a representative block diagram overview of a portion of an exemplary Advanced Metering System (AMS) including an associated handheld or mobile device and such device's operational relationship with the AMS.

With reference now to FIG. 2, there is illustrated a representative block diagram overview of a portion of an exemplary Advanced Metering System (AMS) generally 200 including an associated handheld or mobile device 296 and such device's operational relationship with the AMS 200. AMS 200 may include, without limitation, a Radio Relay or Cell Control Unit (CCU) generally 272 configured to communicate via internal radio circuitry (not separately illustrated) and a representative external antenna 274 with WAN 140 (FIG. 1), which may correspond at least in part with RF LAN generally 262. RF LAN 262 is configured to communicate by radio frequency transmissions with, inter alia, metrology device 242 by way of an associated endpoint device and associated antenna 244 (which together with related functionality may also be regarded as being utility metrology means).

Also illustrated in representative FIG. 2 is a handheld or mobile device generally 296 that is configured per the present subject matter to perform multiple tasks including meter reading operations as well as instructional transmissions of commands by way of internal radio transmission circuitry (not separately illustrated) and a representative external antenna 298. Handheld or mobile device 296 may also engage in the transmission of other relevant information to and from both metrology device 242 and WAN 140 (FIG. 1) by way of RF LAN 262 and Radio Relay/CCU 272.

Figure 3:
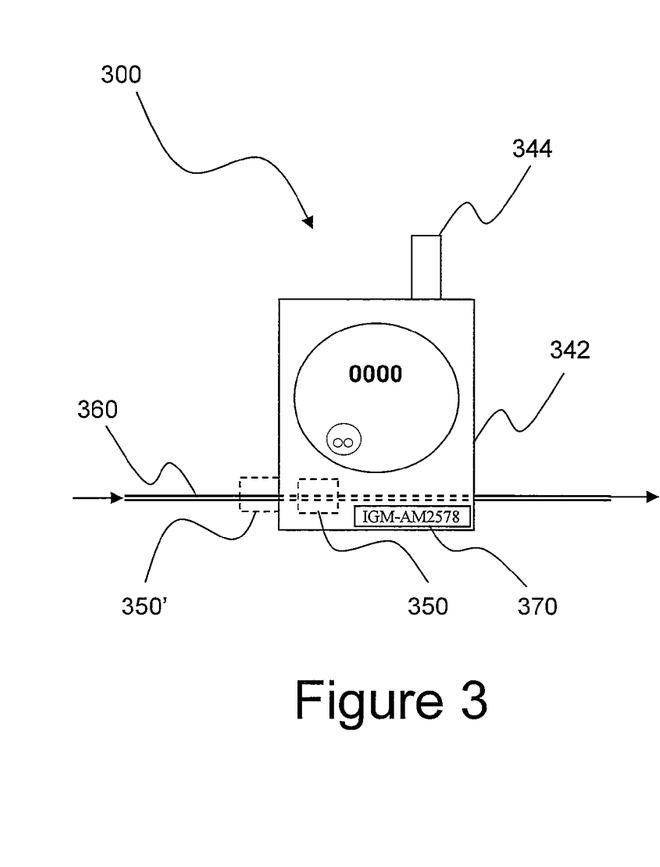
FIG. 3 is a general representation of a gas metering device incorporating a remotely controllable disconnect and/or reconnect valve in accordance with present technology.

In accordance with present technology, metrology device 242 may be provided with a shut off and/or reconnect valve, as more fully illustrated in present FIG. 3. Referring now to FIG. 3, there is illustrated a gas metering system 300 including a metering device 342 that incorporates a disconnect/reconnect valve 350, 350'. Such encompassed structure may be thought of in other terms with related functionality as constituting disconnect means, associated with at least one of the utility metrology means and its associated endpoint device, for disconnecting a utility supply associated with the at least one utility metrology means at its respective location in response to a disconnect signal transmitted to the disconnect means. In an exemplary embodiment, valve 350 may be incorporated inside metering device 342 so as to be inline with gas line 360 as such line 360 enters and exits metrology device 342. In an alternative embodiment, valve 350' may be located on (or external to) metrology device 342 but still coupled inline with line 360 in order to control gas supply to a consumer. Alternatively still, valve 350 may be associated with other non-metrology devices such as, but not limited to, a pressure regulator device. In all of such instances, all encompassed by the present subject matter, an endpoint communications device will be associated with the valve or its hosting device in order to permit communications therewith in accordance with present technology.

Those of ordinary skill in the art will appreciate that communication from head end 150 may be by way of RF communications to an endpoint, for example general telemetry endpoint 116, that may be associated with or incorporated in metrology device 242 over a fixed network as generally illustrated in FIG. 1. Alternatively, communications may be provided in whole or in part by other communications methodologies including, but not limited to all types of wired and wireless communications or combinations thereof, now or later existing.

In accordance with present technology, if the need arises to disconnect a gas utility customer at a particular location, be it for delinquency, location vacancy, or other reasons, such disconnection may be effected by way of a data collection device such as handheld or mobile device 296. Further, in accordance with present technology, disconnection may be performed via handheld or mobile device 296 as part of the normal process of collecting (reading) data along a particular route. Similarly, and further in accordance with present technology, disconnection may be accomplished by transmission of disconnect instruction to a specific endpoint device associated with a particular meter and transmitted to such endpoint device by way of a fixed network metering system such as the Advanced Metering System generally 100 exemplarily illustrated in FIG. 1 (or via some other form of network or communications technique, now or later existing).

In light of such present advances in the art, gas utilities are enabled for significant savings in manpower and expenses by performing required or desired disconnections as a part of regular data collection activities or from a central location, as either required or desired, without having to dispatch any equipment or personnel to the disconnection location or locations.

Along with the advantages associated with the present technology as outlined above, it is, never-the-less, desirable to be able to controllably/selectively reconnect service (for whatever reason) that has been previously discontinued. Reconnection, however, unlike disconnection, carries a greater degree of certain safety implications that may in certain instances be left to only those instances where authorized personnel are physically present at the time gas supply is reconnected. For example, if gas could be reconnected remotely, a situation could exist where a stove was left on and the pilot light extinguished. When the gas is subsequently reconnected, gas would flow creating a dangerous situation.

In accordance with certain embodiments of the present technology, safety reconnection features are provided, in part, in the form of a unique meter identification physically associated with the meter to be reconnected.

It should be appreciated by those of ordinary skill in the art that while the present disclosure relates more particularly to gas meters and safety issues concerning reconnection of gas supplies, similar issues may be ascribed to water meters as remote water reconnection to a location where damage to the consumer's side of the water line is present can also result in further undesirable and/or dangerous consequences.

With further reference to FIG. 3, it will be noted that exemplary indicia 370 may be affixed, for example, to a front or other portion of metrology device 342. In certain embodiments of the present technology, indicia 370 may comprise humanly readable indicia, thereby allowing access by a gas company representative to an identification number uniquely associated with the meter. In alternative embodiments, such indicia may require machine-assisted devices or technology for "reading" such indicia, either visually (for example, bar code) or electronically (for example, RFID tags or the like).

In operation, a gas company representative may read indicia 370 and enter corresponding data in a handheld device similar or identical to handheld device 296 (FIG. 2). Such data may be entered using a keyboard or alternate data entry means (not presently illustrated), or directly/automatically entered into such handheld device upon machine reading thereof. Following entry of data corresponding to indicia 370, handheld device 296 may be activated to transmit a signal containing or representing the data corresponding to indicia 370 to metrology device 342 by way of an associated endpoint device representatively illustrated by antenna 344 affixed to metrology device 342. If the transmitted data matches corresponding data stored within a memory component associated with metrology device 342, reconnection of the gas supply may be initiated (or cleared for initiation). In the event of a non-match, per the present subject matter, the valve will not be permitted to open. Such encompassed structure may be thought of in other terms with related functionality as constituting disconnect/reconnect means, associated with at least one of the utility metrology means and its associated endpoint device, for disconnecting and reconnecting a utility supply associated with the at least one utility metrology means at its respective location in response to disconnect and reconnect signals transmitted thereto. Such features may further be considered as being remotely controllable disconnect/reconnect means, associated with at least one utility metrology means and its associated endpoint device, for disconnecting a utility supply associated with such utility metrology means at its respective location in response to a disconnect signal transmitted to said disconnect/reconnect means, and for selectively reconnecting such utility supply only in response to a coded reconnect signal transmitted thereto. By requiring a gas company representative to be at the meter to read indicia 370, he or she would also be in the proximity of customer appliances and could relight pilot lights as required, or handle other on-site requisite functions and/or inspections before reconnecting such gas or other disconnected commodity.

In an alternated embodiment, indicia 370 may be provided as a machine readable indicia and handheld device 296 may be equipped with scanning or other reading technology that requires physical presence to read the indicia. Other machine readable data may include, for example without limitation, RFID devices uniquely coded to the meter. Regardless of the type of readable media associated with the meter or its associated endpoint device, the reclosure operation of the gas valve preferably is permitted only upon condition of the physically proximate location of the device, e.g., handheld device 296, requesting initiation of reclosure.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An advanced meter reading system for transmitting between user locations and a centralized data collection facility data and commands related to utility usage and utility supply connections, said system comprising:
    a plurality of utility metrology means and associated endpoint devices, situated at respective locations of utility consumption, for bidirectional communications for transmitting utility consumption data associated with a respective location and for receiving commands thereto;
    at least one remotely controllable disconnect/reconnect valve means, associated with at least one of said utility metrology means and its associated endpoint device, for disconnecting the flow of a utility supply commodity associated with said at least one utility metrology means at its respective location in response to a disconnect signal transmitted to said disconnect/reconnect means, and for selectively reconnecting such utility supply only in response to a uniquely coded reconnect signal transmitted directly thereto;
    a main communications network for bidirectional communications with said endpoint devices;
    a head end processor for bidirectional communications with said main communications network, such that utility consumption data and disconnect signal commands, respectively, are communicated to and from said head end processor via said main communications network; and
    an RF communication mobile device in direct RF communication with an endpoint device, for controllably receiving utility consumption data and for selectively sending to such endpoint device, without use of said main communications network, reconnect signal commands incorporating a uniquely coded reconnect signal embedded therein;
    wherein said uniquely coded reconnect signal includes onsite indicia uniquely associated onsite with a respective location at which utility supply is to be reconnected, so that control of sending reconnect signal commands to a given respective location is restricted to an authorized operator of the mobile device having access to onsite indicia at such given respective location.

2. An advanced meter reading system as in claim 1, wherein said indicia comprises one of human readable indicia physically associated with a metrology means to be reconnected and electronically readable indicia associated onsite with such metrology means.

3. An advanced meter reading system as in claim 2, wherein such metrology means includes memory for counterchecking coded reconnect data received thereat and blocking operation of disconnect/reconnect valve means at such respective location if such coded reconnect data does not match such memory.

4. An advanced meter reading system as in claim 1, further comprising:
at least one collector, for bidirectional communications with said endpoint devices and a main communications network; and
a plurality of remotely controllable disconnect/reconnect valve means, respectively associated with selected of said endpoint devices, for respectively disconnecting the flow of a utility supply commodity associated with such endpoint device locations in response to respective disconnect signals transmitted thereto, and for selectively reconnecting such utility supply only in response to a uniquely coded reconnect signal for its respective location transmitted thereto;
wherein said utility consumption comprises one of gas and water consumption.

5. An advanced meter reading system as in claim 1, further comprising:
a plurality of remotely controllable disconnect/reconnect valve means, respectively associated with selected of said endpoint devices, for respectively disconnecting the flow of a utility supply commodity associated with such endpoint device locations in response to respective disconnect signals transmitted thereto, and for selectively reconnecting such utility supply only in response to a uniquely coded reconnect signal for its respective location transmitted thereto;
wherein said utility consumption comprises gas consumption;
said utility metrology means comprise respective gas meters;
said utility supply comprises a gas line associated with said utility consumption locations; and
said disconnect/reconnect valve means respectively comprise controllable valves inline with such supply gas line and associated with its respective endpoint device.

6. An advanced meter reading system as in claim 1, wherein:
said utility consumption comprises gas consumption;
said system further comprises a plurality of telemetry devices respectively associated with a plurality of utility consumption locations, each of said telemetry devices monitoring for a preselected condition at its respective location, and transmitting data to said head end processor related to such preselected condition; and
said telemetry devices respectively include alarm means for forwarding alarm signaling to said head end processor whenever the monitored preselected condition thereat falls outside set parameters.

7. An advanced meter reading system as in claim 1, wherein:
said head end processor further comprises data management means, for storing and processing utility consumption data; and
said main communications network comprises one of a WAN, a wireless network, and the internet.

8. An advanced meter reading system as in claim 1, further comprising:
at least one collector, for bidirectional communications with said endpoint devices and a said main communications network;
a plurality of remotely controllable disconnect/reconnect valve means, respectively associated with selected of said endpoint devices, for respectively disconnecting the flow of a utility supply commodity associated with such endpoint device locations in response to respective disconnect signals transmitted thereto, and for selectively reconnecting such utility supply only in response to a uniquely coded reconnect signal for its respective location transmitted thereto; and
an RF communication mobile device selectively in direct RF communication with an endpoint device, for controllably receiving utility consumption data and for selectively sending to an endpoint device, without use of said communications network, reconnect signal commands incorporating a uniquely coded reconnect signal embedded therein, uniquely associated with a respective location at which utility supply is to be reconnected;
wherein said utility consumption comprises gas consumption;
said utility metrology means comprise respective gas meters;
said utility supply comprises a gas line associated with said utility consumption locations;
said disconnect/reconnect valve means respectively comprise controllable valves inline with such supply gas line and associated with its respective endpoint device;
said head end processor further includes data management functionality, for storing and processing utility consumption data;
said main communications network comprises one of a WAN, a wireless network, and the internet; and
said uniquely coded reconnect signal includes indicia uniquely associated with a respective location at which utility supply is to be reconnected, and entered into said mobile device by a user situated at a respective location to be reconnected.

9. A bidirectional gas AMI network for transmitting commands and gas supply related data between user locations and a centralized data collection facility, said network comprising:
a plurality of combined host/endpoint devices associated with respective gas locations, said endpoint devices providing bidirectional RF communications from its respective location;
a plurality of remotely controllable disconnect/reconnect means, respectively associated with selected of said endpoint devices, for respectively disconnecting a gas supply associated with such endpoint device locations in response to respective disconnect signals transmitted thereto, and for selectively reconnecting such gas supply only in response to a coded reconnect signal for its respective location transmitted thereto;
a main communications network for bidirectional communications with said endpoint devices;
a centralized data collection facility in bidirectional communications with said main communications network, such that gas supply related data and disconnect signal commands, respectively, are communicated to and from said centralized data collection facility via said main communications network; and
a mobile device in RF communication with other components of said network, for controllably receiving gas supply related data, and in direct RF communication with selective of said endpoint devices for selectively sending reconnect signal commands incorporating a uniquely coded reconnect signal embedded therein, having onsite indicia uniquely associated onsite with a targeted disconnect/reconnect means at a given respective location at which gas supply is to be reconnected, so that reconnect signal control is restricted to an authorized operator of said mobile device having access to onsite indicia at such given respective location.

10. A network as in claim 9, further including:
a plurality of data collection devices, for bidirectional communications with selected of said endpoint devices and said main communications network; and
wherein said indicia comprises one of human readable indicia physically associated with an endpoint device location to be reconnected and electronically readable indicia associated onsite with such location to be reconnected.

11. A network as in claim 9, wherein said host devices comprise one of a pressure regulator device, and a gas metrology device so that combined gas metrology/endpoint devices obtain and transmit gas usage data associated with their respective location.

12. A network as in claim 11, wherein:
said disconnect/reconnect means respectively comprise controllable valves inline with a supply gas line associated with its respective endpoint device; and
such gas metrology device includes memory for counterchecking coded reconnect data received thereat and blocking operation of said targeted disconnect/reconnect means at such respective location if such coded reconnect data does not match such memory.

13. A network as in claim 9, wherein:
said centralized data collection facility includes a head end processor having meter data management means for storing and processing data received via said network; and
said main communications network comprises one of a WAN, a wireless network, and the internet.

14. A method for gathering data for monitoring gas consumption associated with a gas pipeline of a gas utility provider, and for selectively disconnecting gas supplies at selected locations and safely reconnecting previously disconnected gas supplies, such method comprising:
transmitting gas consumption data from a plurality of endpoint devices associated with respective locations of gas utility usage;
communicating such data to a head end processor via a main communications network;
selectively transmitting disconnect signal commands from such head end processor to disconnect valves at selected locations of gas utility usage, to disconnect such locations from an associated gas supply; and
using a mobile RF device under authorized operator control to selectively transmit directly to a targeted respective gas utility usage location reconnect signal commands incorporating a uniquely coded reconnect signal embedded therein, uniquely and physically associated with a targeted respective gas utility usage location to be reconnected, wherein said uniquely coded reconnect signal is based on onsite indicia at the targeted respective gas utility usage location, which onsite indicia is accessible at such targeted respective gas utility usage location by an authorized operator for sending the reconnect signal commands.

15. A method as in claim 14, further including:
counterchecking a transmitted coded reconnect signal to confirm a match with a targeted location to be reconnected; and
thereafter reconnecting such location to an associated gas supply.

16. A method as in claim 15, wherein such reconnecting includes selected activation of controllable valves operatively associated inline with selected sections of a supply gas pipeline, respectively associated with a targeted location.

17. A method as in claim 14, wherein said coded reconnect signal is based on indicia uniquely associated with a targeted respective gas utility usage location to be reconnected, which indicia comprises one of human readable indicia physically associated with a metrology means to be reconnected and electronically readable indicia associated onsite with such metrology means, thereby requiring operator presence at such metrology means for entry of coded reconnect data into said mobile device.

18. A method as in claim 14, further including:
using the mobile device to selectively transmit disconnect signal commands to disconnect valves at selected locations of gas utility usage, to disconnect such locations from an associated gas supply;
conducting data management at the central location, for storing and processing gas consumption data received thereat via the network; and
wherein the network at least in part comprises one of a WAN, a wireless network, and the internet.

* * * * *